Patented Jan. 16, 1923.

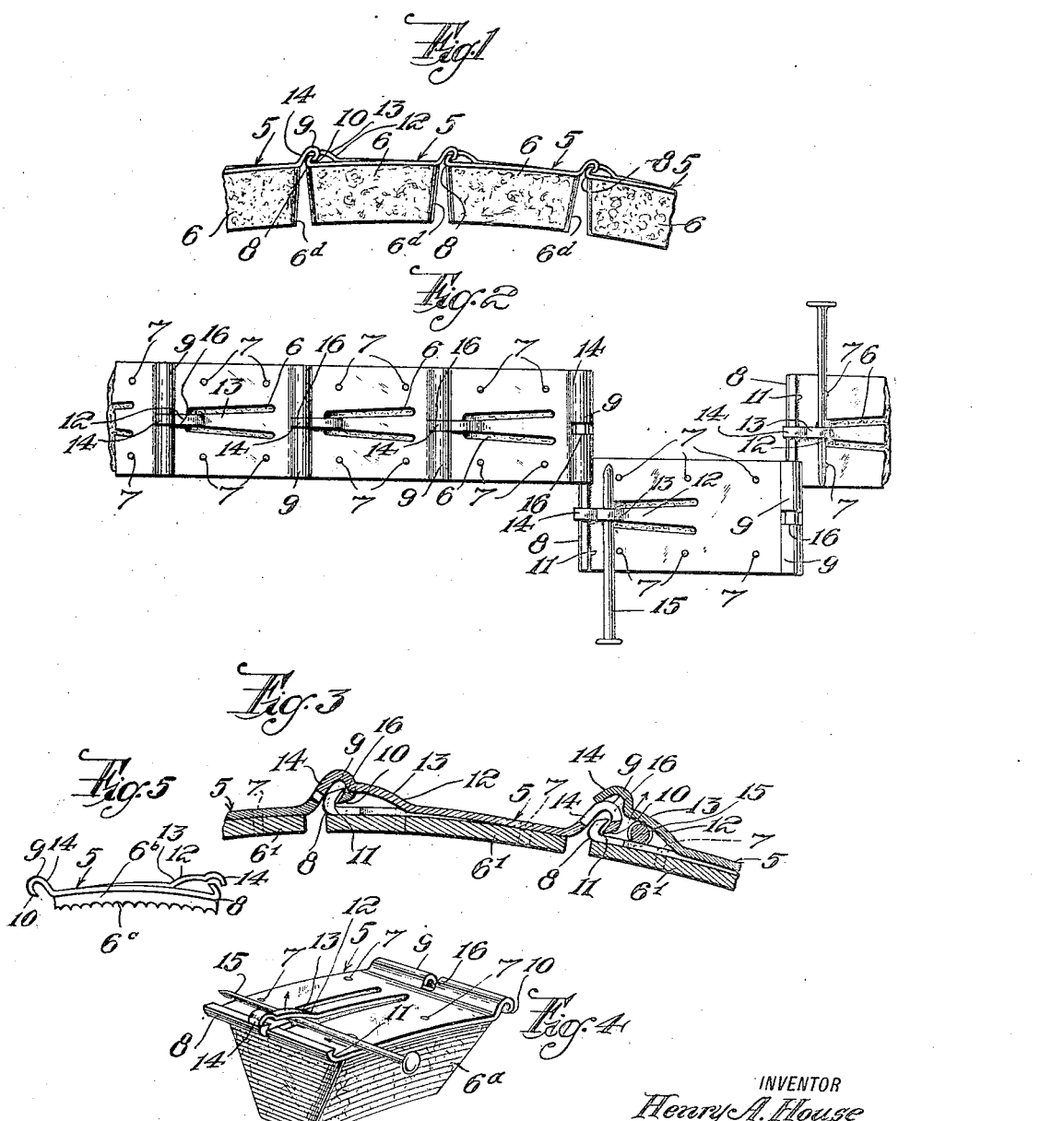

1,442,524

UNITED STATES PATENT OFFICE.

HENRY A. HOUSE, OF BRIDGEPORT, CONNECTICUT.

LINK BELTING.

Application filed April 4, 1922. Serial No. 549,382.

*To all whom it may concern:*

Be it known that I, HENRY A. HOUSE, a citizen of the United States, and a resident of Bridgeport, county of Fairfield and State of Connecticut, have invented certain new and useful Improvements in Link Belting, of which the following is a specification.

This invention relates to link belting and has for one of its objects to provide composite belt units each consisting of a stamped metal body plate and a pulley engaging member of a suitable friction material secured upon one side of the body plate, said body plate being provided with means at its opposite ends whereby the individual belt units may be easily and quickly connected to or disconnected from similar adjacent units.

In one embodiment of the present invention, I provide the body plate of each composite belt link at one of its ends with a spring latch tongue having its free end portion formed for interlocking engagement with the opposed end of an adjacent link plate, the said latch tongue also having its remaining portion spaced from the surface of the plate to permit of the insertion of a nail or other suitable element between the tongue and the plate in order to effect the release of the tongue from its interlocked position, whereby the adjacent links can be readily disconnected.

It is also a further general object of the invention to provide a link belt composed of the improved composite units, which units may be constructed in various lengths whereby the belt may be tightened upon the pulley surfaces as required, and in which the continuous belt structure will have the requisite degree of flexibility.

With the above and other objects in view, the invention consists in the improved link belting and in the form, construction and relative arrangement of the several parts of the composite belt units, as will be hereinafter more fully described, illustrated in the accompanying drawings and subsequently incorporated in the subjoined claims.

In the drawings wherein I have illustrated one satisfactory and practical embodiment of the invention and in which similar reference characters designate corresponding parts throughout the several views, Figure 1 is a side elevation of a section of a belt composed of my improved composite belt units;

Fig. 2 is a top plan view thereof illustrating the manner in which any one of the belt units may be removed or replaced in the belt structure;

Fig. 3 is an enlarged central longitudinal section and showing a slightly different form of the friction member carried by each belt unit;

Fig. 4 is a perspective view of one of the belt units showing the latch tongue in its released position and the link plate provided with another form of the friction member; and Fig. 5 is a side elevation of a belt unit showing another alternative form of the friction member.

In Patent No. 1,205,210 granted to me November 21st, 1916, there is disclosed a flexible sheet metal belting, and it is the purpose of my present invention to provide certain improvements in the individual units of a flexible belt of that character. To this end I propose to construct such a belt from a series of composite units, and in the illustrated embodiment of the invention I have shown each unit as consisting of a metal body plate 5 and a member 6 of friction material permanently and securely fixed to one side of the body plate by means of rivets 7 or other equivalent fastening devices. The contacting surfaces of the metal body plates and the friction members are of substantially the same area and said members may consist of relatively thick sections of cork in which form they are represented in Fig. 1 of the drawings.

The body plate 5 of each belt unit is provided at its opposite ends with means for flexibly and detachably interlocking said plate with the body plates of similar adjacent belt units. This connecting means in its primary features corresponds to that disclosed in my prior patent above referred to. In other words, each plate 5 is provided at one of its ends with an angularly disposed retaining lip 8 extending across the entire width of the plate and forming an acute angle with relation to the body of said plate. At its opposite end the plate 5 is also angularly bent across its entire width and the edge portion thereof is formed with a reverse bend and extends towards the plate 5 to thereby provide a bearing 9, said bearing and the retaining lip 8 projecting from the same side of the plate 5, namely, the opposite side of said plate to that upon which the friction member 6 is secured. The bearing 9 terminates in a knife edge 10 which is adapted to rock upon the seat 11 formed at the juncture of the inner side face of the lip 8 with the surface of the plate 5.

The plate 5 of each belt unit is in the form of a metal stamping and is centrally provided with a longitudinally extending latch tongue 12. This tongue at one of its ends is integral with the body of the plate 5 adjacent to the bearing 9 and gradually tapers in width to a point in spaced relation to the lip 8 where said tongue is formed with a bend or curve 13. At the end of this curved section the latch tongue terminates in a bill 14 having substantially the same curvature as the bearing 9 on the opposite end of the plate. Normally, this terminal bill of the latch tongue is positioned slightly beyond the edge of the lip 8 and overhangs said lip. In assembling the composite belt units to form a belt, as each unit is inserted in place a nail or other suitable implement indicated at 15, is inserted transversely between the bend 13 of the latch tongue and the surface of the plate 5 to force the terminal bill 14 of the tongue outwardly away from the lip 8. Thus, in connecting adjacent links the end of the lip 8 may be readily inserted in the groove or channel of the bearing 9 of another composite link and moved transversely until the side edges of the links are in alignment with each other. The bearing 9 on each belt unit is centrally provided with a slot or opening 16 so that when the nail or implement 15 is withdrawn the latch tongue 12 will return to its normal position and the terminal bill 14 thereof will snap into the opening 16 and thus interlock the belt units in connected relation. Free relative flexing movement of these belt units is permitted owing to the rocking contact of the edge of the bearing 9 upon the inner side of the lip 8, it being understood that the opening 16 is of somewhat greater length than the length of the terminal bill 14 so as to permit the latch tongue to move freely with the belt units in such relative flexing movement of the links without possibly springing the latch tongue outwardly to such an extent that the adjacent belt units would shift transversely relative to each other.

By reason of the composite belt unit construction above described, a continuous belt of any desired length may be readily produced, the friction members 6 contacting with the surfaces of the pulleys insuring a non-slipping engagement of the belt with said pulleys and a positive transmission of driving power from one pulley to another. It will be understood that the individual composite links can be made in various lengths so that when required a long link may be readily removed and replaced by a shorter link to take up slack and tighten the belt, or, contrariwise, a short link may be replaced by a long link when it is desired to extend the length of the belt.

In Figure 3 of the drawings, instead of providing each of the composite belt units with a friction member 6 of cork, as in Figure 1, I show a relatively thin section or layer of leather 6' and in Figure 4 I have illustrated a form of friction member at $6^a$ which is made up of a plurality of layers or laminations of leather or other composition friction material so that the friction member may be readily built up to any desired thickness.

In Figure 5 I have shown the friction member as consisting of a layer or sheet of rubber $6^b$ having a corrugated pulley contacting surface $6^c$.

In each form of the composite belt unit having the different friction members as above referred to, it will be noted that the friction member at one of its ends extends substantially to the right end edge of the body plate having the lip 8 thereon, while the bearing 9 at the opposite end of the plate projects for a considerable distance beyond the corresponding end of the friction member. Thus the ends of the friction members of adjacent belt units will be spaced from each other when said units are connected and there will be no binding engagement between the end faces of the adjacent friction members in the flexing of the belt.

In Figures 1 and 4 of the drawings where the friction members are shown of considerable thickness, the end as well as the side faces of said members, are beveled or inclined as at $6^d$ so that said end faces of adjacent friction members extend in divergent relation to each other from the body plates 5, thus permitting of the requisite degree of relative flexing movement of the adjacent belt units.

From the foregoing description considered in connection with the accompanying drawings, the construction and several advantages of the present improvements will be fully understood. It will be seen that each of the composite belt units in itself, constitutes a complete belt section, it being unnecessary to surface the belt pulleys with the friction material. In addition to making the belt units of different lengths as above explained, they may also be produced in relatively different widths so that by arranging the units of different widths alternately as explained in my prior patent, a continuous belt of any predetermined width may be produced.

I have herein referred to several different forms of the friction members of the composite belt units which might be employed, but this is not to be understood as implying any limitations since it is obvious that such friction members of other materials and equivalent forms might be substituted for those herein described. Likewise the specific form of the latch tongue and other structural features of the belt unit are susceptible of certain structural modifications and it will, accordingly, be understood that I reserve the privilege of adopting all such legitimate changes therein as may be fairly embodied within the spirit and scope of the invention as claimed.

I claim:

1. A composite belt unit comprising a metal plate having a retaining member at one of its ends and a bearing member at its opposite end, said bearing and retaining members projecting angularly from the same side of said plate and said retaining member adapted for detachable interlocking engagement in the bearing member of a similar adjacent unit and a pulley engaging member of frictional material permanently secured upon the opposite side of said plate and extending in one direction to the extreme end of the plate having the retaining member thereon and terminating at the opposite end of said plate substantially at the point of juncture of the angularly projecting bearing member with the body of the plate.

2. A belt unit comprising a plate having a retaining member at one of its ends and a bearing member at its opposite end, said bearing member adapted to be flexibly interlocked with the retaining member of a similar adjacent unit, and a spring latch tongue struck from said plate and terminating in means adapted for interlocking engagement with the bearing member of an adjacent unit, a part of said latch tongue adjacent to said terminal means being spaced from the surface of said plate to permit of the insertion of an implement therebetween whereby the latch tongue may be sprung from its normal position out of interlocking engagement with the bearing member on the adjacent unit to permit of the disconnection of said units.

In testimony that I claim the foregoing as my invention, I have signed my name hereunder.

HENRY A. HOUSE.